Feb. 15, 1966  W. E. W. JACOB  3,235,676
INSULATION AND SHORT CIRCUIT TESTING APPARATUS FOR A PULSE
COMMUNICATION SYSTEM
Filed Oct. 27, 1961

INVENTOR
WALTER EMIL WILHELM JACOB

BY Hane & Nydick
ATTORNEYS

United States Patent Office 3,235,676
Patented Feb. 15, 1966

3,235,676
INSULATION AND SHORT CIRCUIT TESTING APPARATUS FOR A PULSE COMMUNICATION SYSTEM
Walter Emil Wilhelm Jacob, Hagersten, Sweden, assignor to Telefonaktiebolaget L M Ericsson, Stockholm, Sweden, a corporation of Sweden
Filed Oct. 27, 1961, Ser. No. 148,198
Claims priority, application Sweden, Nov. 22, 1960, 11,237/60
4 Claims. (Cl. 179—175.2)

The present invention refers to a combined insulation- and short-circuit testing of a multi-channel pulse communication system with signal places connected at the same time to the same channel and with a transmission path connected between said signal places through pulse controlled contacts, which transmission path has a total capacitance of a magnitude determined by the physical conditions of the transmission means.

When testing a communication system an insulation test has in general to be performed in order to establish if there is a short-circuit or not and a short-circuit test (transmission test) in order to establish if there is any break in the circuits. The insulation test can be performed by connection of a testing device to an inlet or an outlet of the system. The short-circuit test can be performed by two testing devices, one of which (a sender) is connected to an inlet and the other of which (a receiver) is connected to an outlet of the system. For the testing of all the connection possibilities of the system, the sender or the receiver must be cyclically moved to all inlets or outlets, respectively, which is troublesome and time-consuming. In multi-channel pulse communication systems operating according to the time multiplex principle and arranged in accordance with the Swedish Patent 164,398, that is with carefully pulse controlled contacts in the transmission path, the capacitance of which is determined in advance and adjusted with regard to the technical transmission conditions, it is possible to simplify the testing to a considerable extent. The transmission means of the system are used in a manner such that the previously mentioned receiver on the side of the system turned away from the sender is of no use. A system in accordance with the invention comprises a testing circuit containing a capacitor, which is connectable to the transmission system through a pulse controlled contact and which is charged when connected. The testing circuit together with the transmission system form an oscillating circuit, the oscillating time of which is equal to $\tau/m$, where $\tau$ is the time during which the pulse controlled contacts are closed and $m$ is a whole number larger than 0. The system of the invention also includes an indicating arrangement for indication of charging losses in the mentioned capacitor of the testing circuit.

Figure 1:
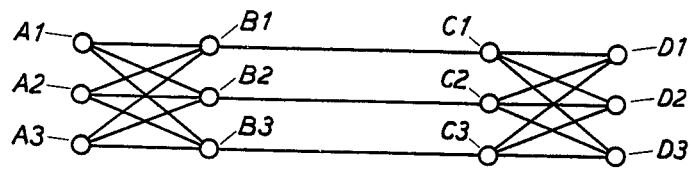
Figure 2:
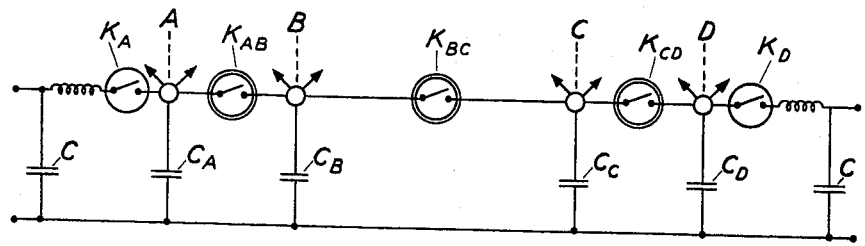
Figure 3:
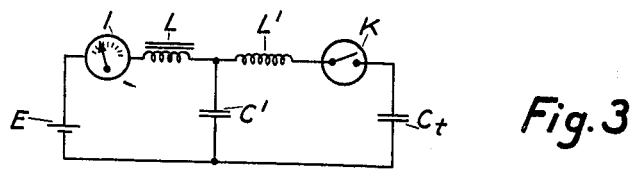
Figure 4:
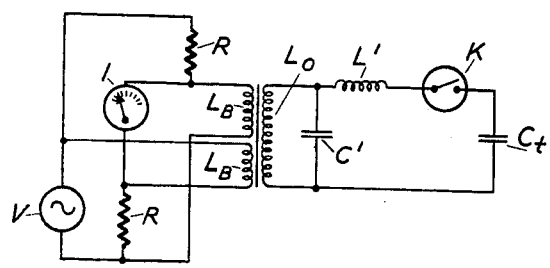

The invention will be further described in connection with the attached drawing, where FIG. 1 schematically shows an example of a transmission system for which the system according to the invention is intended, FIG. 2 shows a transmission path in a system of the same type as in FIG. 1 with pulse controlled contacts, FIG. 3 shows a circuit diagram of an arrangement according to the invention, and FIG. 4 shows a modification of the arrangement according to FIG. 3.

The transmission system according to FIG. 1 comprises a number of primary transmission points A1, A2, A3 and D1, D2, D3 and a number of secondary transmission points B1, B2, B3 and C1, C2, C3. Each of the transmission points A1, A2 and A3 is connected through a contact, not shown, with all the transmission points B1, B2 and B3, which in turn are connected through contacts, not shown, to the respective transmission point C1, C2 and C3. These points are connected through contacts, not shown, to all the transmission points D1, D2 and D3. In all the lines which connect the different transmission points, a contact is thus to be placed. The telephone subscribers are connected through pulse controlled contacts to the primary transmission points, and a transmission between two subscribers is established by simultaneously closing all the contacts in a transmission path between the subscribers. Such a transmission path can for instance comprise the transmission points A1-B2-C2-D3. It appears from this that there is a large number of transmission paths, and therefore a testing according to the conventional principle is expensive and troublesome. In a multi-channel pulse communication system with such a transmission system it is known to dimension the total capacitance of the system in a definite way relative to the capacitance existing at the subscriber places and also to balance the closing time of the contacts in a special way in order to have the transmission as good as possible. The Swedish Patent 164,398 states for instance that the total capacitance of the transmission system should be $$\frac{2C}{4n^2-1}$$

where $C$ is the capacitance in the termination capacitor of a low pass filter at a signal place (telephone subscriber) and $n$ is a whole number larger than 0. In the present invention, the total capacitance of a transmission system is in advance calculated and adjusted in a certain way with regard to the available transmission means.

To the transmission path A-B-C-D in FIG. 2 a termination capacitor with the capacitance $C$ in a signal place is connected through an inductance and an individual pulse controlled contact $K_A$. The connection is made to a primary transmission point A, to which several other signal places are connected in the same way, which is indicated by the arrow directed to the left. The transmission point A has a self-capacitance $C_A$ and is over a a contact $K_{AB}$ connected to a secondary transmission point B, which in turn has a self-capacitance $C_B$ and is through a contact $K_{BC}$ connected to another secondary transmission point C and so on. The system is symmetrically composed so that a termination capacitor with the capacitance $C$ in a secondary signal place is connected through an inductance and an individually pulse controlled contact $K_D$ to a primary transmission point D with the self-capacitance $C_D$. The self-capacitances $C_A$, $C_B$, $C_C$ and $C_D$ are so adjusted that the transmission medium obtains a total self-capacitance $$C_A+C_B+C_C+C_D=C_t$$

and at a connection between the two signal places the contacts $K_A$, $K_{AB}$, $K_{BC}$ and $K_D$ are closed for transmission of a pulse during a time period which is in a selected relation to the oscillation time of the oscillation circuit at the two signal places.

The arrangement according to FIG. 3 comprises a testing circuit and an indicating arrangement. The testing circuit consists of a capacitor with the capacitance C' and an inductance L', and is through a pulse controlled contact K connectable to the transmission medium, which in FIG. 3 is represented by a capacitor with the capacitance $C_t$, that is the self capacitance previously mentioned. The capacitor of the testing circuit when connected, must be charged and this occurs via the indicating arrangement E-I-L, which is connected across condenser C' and comprises a battery E, a current metering instrument I and an inductance L serially connected. The elements included in the testing circuit are so dimensioned, that this circuit together with the transmission medium forms an oscillating circuit, the oscillating time of which is equal to $\tau/m$, where $\tau$ is the time during which the pulse controlled contacts are closed and $m$ is a whole number larger than 0. Consequently the dimensioning occurs according to the equation:

$$\frac{\tau}{m}=\frac{1}{f}=2\pi\sqrt{L'\cdot\frac{C'\cdot C_t}{C'+C_t}}$$

where the meaning of L', C' and $C_t$ is clear from FIG. 3. Said inductance L shall have such a magnitude such that no substantial charging of the capacitor of the testing circuit from the battery E will occur during the time $\tau$. By connecting the arrangement now described to the transmission path on which a testing is to be made, the capacitor C' is consequently charged from the battery E. When the contact K is closed (at the same time as the contacts of the transmission medium along the the transmission path which is to be tested) an oscillating cycle is started, which is interrupted after the time $\tau$. If there are no insulation- or short-circuit errors in the transmission path, this time will be sufficiently long for the oscillating circuit $C'L'C_t$ to manage to make $m$ oscillations during the time $\tau$. Disregarding the negligible losses, the charging of the capacitor C' of the testing circuit is thus the same after the breaking of the contact K as before closing of it. A charging via the indicating arrangement E-I-L need not and cannot consequently occur and the instrument I will therefore not indicate. However, if the transmission path is impaired by errors so that its total capacitance does not correspond to the pre-determined value $(C_t)$, the charging of the capacitor of the testing circuit is smaller after the breaking of the contact K than it should be, which results in a recharge of the capacitor from the battery E for substitution of the lost charging. This "lost charging" remains at the individual capacitor of the transmission system until the transmission components causing the charging losses are short-circuited before the transmission of the next pulse between the signal places. This short-circuiting occurs by short-circuit branches parallelly connected to the partial capacitors.

It is evident that many embodiments of the arrangement are possible without departing from the scope of invention. FIG. 4 shows a modification of an indicating arrangement, which consists of a low frequency oscillating circuit $L_oC'$ and a bridge circuit connected to this oscillating circuit. The bridge circuit in two opposite branches includes two similar windings $L_B$ connected magnetically to an inductance $L_o$, which inductance is parallel connected to the capacitor of the testing circuit. In the two remaining opposite branches the bridge circuit includes equal large resistances R. An alternating source V is connected to two diagonal points of the bridge and the indicating instrument I (for example a zero indicator of alternating current type) is connected to the two remaining diagonal points in the bridge circuit.

As an example of a possible dimensioning the following values may be mentioned for the arrangement according to FIG. 4: The time during which the pulse controlled contact K (as well as for the contacts $K_A$ ... $K_D$) is closed is $2\cdot10^{-6}s$. The capacitance C'=the capacitance $C_t$. The frequency of the alternating current source V is 1000 cycles per second to which frequency the oscillating circuit $L_oC'$ is tuned. The inductance value L' is obtained from the relation $$2\cdot10^{-6}=2\cdot\pi\sqrt{L'\cdot\frac{C'\cdot C_t}{C'+C_t}}$$

provided that $m$ is chosen as being equal to 1.

With an arrangement according to the invention it is possible not only to establish that there is an error within the transmission system but also to localize this error. For instance, by arranging the capacitor of the testing circuit for variable adjustment of its capacitance, whereby adaptation is possible to the total capacitance of the transmission system between different points within the system. If for instance the arrangement is connected to the primary transmission point A and then the transmission path A-B-C-D is tested by initiating the contacts $K_{AB}$, $K_{BC}$ and $K_{CD}$, the instrument I in FIG. 3 may indicate that the transmission path in question is impaired by an error. The capacitance C' of the capacitor of the tranmission system is then altered so that this capacitance together with the partial capacitances $C_A$, $C_B$ and $C_C$ but not capacitance $C_D$ of the transmission system form an oscillating circuit, the oscillating time of which is equal to $\tau/m$ like at the first metering. A new testing is now made with only the contacts $K_{AB}$ and $K_{BC}$ initiated. If the instrument I now does not indicate, it is clear that the error is somewhere between C and D. If the instrument I on the other hand is still indicating it is necessary to continue the testing in the same way towards A until the error is localized.

When, as in FIG. 4, the capacitor of the testing circuit at the same time is an integral part of a tuned circuit in the indicating arrangement, it can instead be suitable to make the inductance L' variable and in that way in case of need obtain a tuning adaptation for only certain parts of the total capacitance of the transmission system.

I claim:

1. A testing device for testing insulation and short circuit conditions in a time-multiplex transmission system in which pulse controlled switch contact means periodically set up selected connections in the transmission system, the part of the transmission system including the selected connections having a capacitance value determined by the physical conditions in said part of the system, said testing device comprising a testing circuit including a capacitance means and pulse controlled switch contact means synchronized with the respective switch contact means in the transmission system to connect the testing circuit to the part of the transmission system including the set up connections for testing said part, and a charging circuit including an indicating means connected to said testing circuit for charging the capacitance means thereof, the testing circuit and the part of the transmission system to be tested constituting an oscillating circuit arranged to have an oscillating time equal to $\tau/m$ where $\tau$ is the time during which the pulse controlled synchronized switch contact means of the transmission system and the testing circuit are closed and $m$ is an integer greater than 0, whereby the discharging and recharging of said capacitance means during the time during which said switch contact means are closed is controlled by the capacitance value of the part of the transmission system to be tested, said indicating means indicating the charging of the capacitance means from the charging circuit whereby the indications of the indicating means are indicative of the physical conditions in the part of the transmission system to be tested.

2. A testing device according to claim 1 wherein said charging circuit comprises an inductance means, switch contact means and a source of current connected to the capacitance means of the testing circuit through said inductance means, said inductance means having an inductance value such that the charging time for said capacitance means from said source of current is greater than said oscillating time $\tau/m$.

3. A testing device according to claim 1 wherein the capacitance of the testing circuit is variable for tuning said testing circuit in accordance with a desired capacitance value of the part of the transmission system to be tested.

4. A testing device according to claim 1 wherein said testing circuit comprises a variable inductance means connected in series with the capacitance means in said testing circuit for tuning said circuit in accordance with a desired capacitance value of the part of the transmission system to be tested.

References Cited by the Examiner
UNITED STATES PATENTS

| | | | |
|---|---|---|---|
| 1,968,889 | 8/1934 | Hirsch | 325—452 |
| 2,962,551 | 11/1960 | Johannesan | 179—15 |

ROBERT H. ROSE, *Primary Examiner.*